(12) United States Patent
Biran et al.

(10) Patent No.: US 11,379,430 B2
(45) Date of Patent: Jul. 5, 2022

(54) FILE MANAGEMENT SYSTEMS AND METHODS

(71) Applicant: Dokkio, Inc., San Mateo, CA (US)

(72) Inventors: Ben Biran, San Francisco, CA (US); Eileen Xie, San Francisco, CA (US); Brian Kirchoff, San Mateo, CA (US); Gregory Toprover, Long Beach, CA (US)

(73) Assignee: Dokkio, Inc., San Mateo, CA (US)

( * ) Notice: Subject to any disclaimer, the term of this patent is extended or adjusted under 35 U.S.C. 154(b) by 78 days.

(21) Appl. No.: 16/683,006

(22) Filed: Nov. 13, 2019

(65) Prior Publication Data

US 2020/0151150 A1 May 14, 2020

Related U.S. Application Data

(60) Provisional application No. 62/760,475, filed on Nov. 13, 2018.

(51) Int. Cl.
| | | |
|---|---|---|
| *G06F 17/00* | (2019.01) | |
| *G06F 16/182* | (2019.01) | |
| *G06F 16/11* | (2019.01) | |
| *G06F 16/13* | (2019.01) | |

(52) U.S. Cl.
CPC ........ *G06F 16/1824* (2019.01); *G06F 16/122* (2019.01); *G06F 16/13* (2019.01)

(58) Field of Classification Search
None
See application file for complete search history.

(56) References Cited

U.S. PATENT DOCUMENTS

| | | | |
|---|---|---|---|
| 8,438,155 B1* | 5/2013 | Fedorynski | G06F 16/951 |
| | | | 707/723 |
| 2003/0101028 A1* | 5/2003 | Banks | G06F 17/18 |
| | | | 702/189 |
| 2005/0144162 A1 | 6/2005 | Liang | |
| 2006/0248458 A1 | 11/2006 | Li | |
| 2007/0112784 A1* | 5/2007 | Blumenau | G06F 21/6218 |
| 2008/0281781 A1 | 11/2008 | Zhao | |
| 2013/0124503 A1* | 5/2013 | Ishii | G06F 16/13 |
| | | | 707/741 |
| 2014/0033094 A1* | 1/2014 | B'Far | G06F 3/0481 |
| | | | 715/765 |
| 2015/0113131 A1* | 4/2015 | Veenstra | G06F 8/71 |
| | | | 709/224 |
| 2017/0364538 A1 | 12/2017 | Jacob | |
| 2018/0150454 A1* | 5/2018 | Sharma | G06F 40/226 |
| 2018/0196502 A1* | 7/2018 | Smith | G06F 3/04815 |
| 2018/0268614 A1* | 9/2018 | Byers | G06T 19/20 |
| 2019/0333078 A1* | 10/2019 | Bala | G06Q 30/0201 |
| 2019/0392333 A1* | 12/2019 | Vega | H04W 12/12 |

* cited by examiner

*Primary Examiner* — Hasanul Mobin
(74) *Attorney, Agent, or Firm* — David R. Stevens; Stevens Law Group

(57) ABSTRACT

Example file management systems and methods are described. In one implementation, a system identifies multiple files associated with a user where the multiple files are stored on multiple file storage systems. A search request is received from the user for at least one file. The system locates at least one file based on the search request by analyzing file categorization and characterization data associated with the multiple files.

20 Claims, 18 Drawing Sheets

FILE MANAGEMENT SYSTEMS AND METHODS

CROSS REFERENCE TO RELATED APPLICATIONS

This application claims the benefit of U.S. Provisional Application Ser. No. 62/760,475, entitled "File Management Systems and Methods," filed Nov. 13, 2018, the disclosure of which is incorporated herein by reference in its entirety.

TECHNICAL FIELD

The present disclosure relates to file management systems and methods that are capable of analyzing files from multiple sources and presenting the files to a user or system.

BACKGROUND

Some existing document categorization systems perform a mathematical comparison of a document to a generalized sample of a category. These systems are typically limited to the existing knowledge represented by the samples provided. Other document categorization systems perform a mathematical pairwise comparison of a document to the other documents in a particular set to form groups of similarity. However, this approach can be costly and ambiguous.

Accordingly, what is needed is an improved approach for categorizing and identifying various types of documents.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
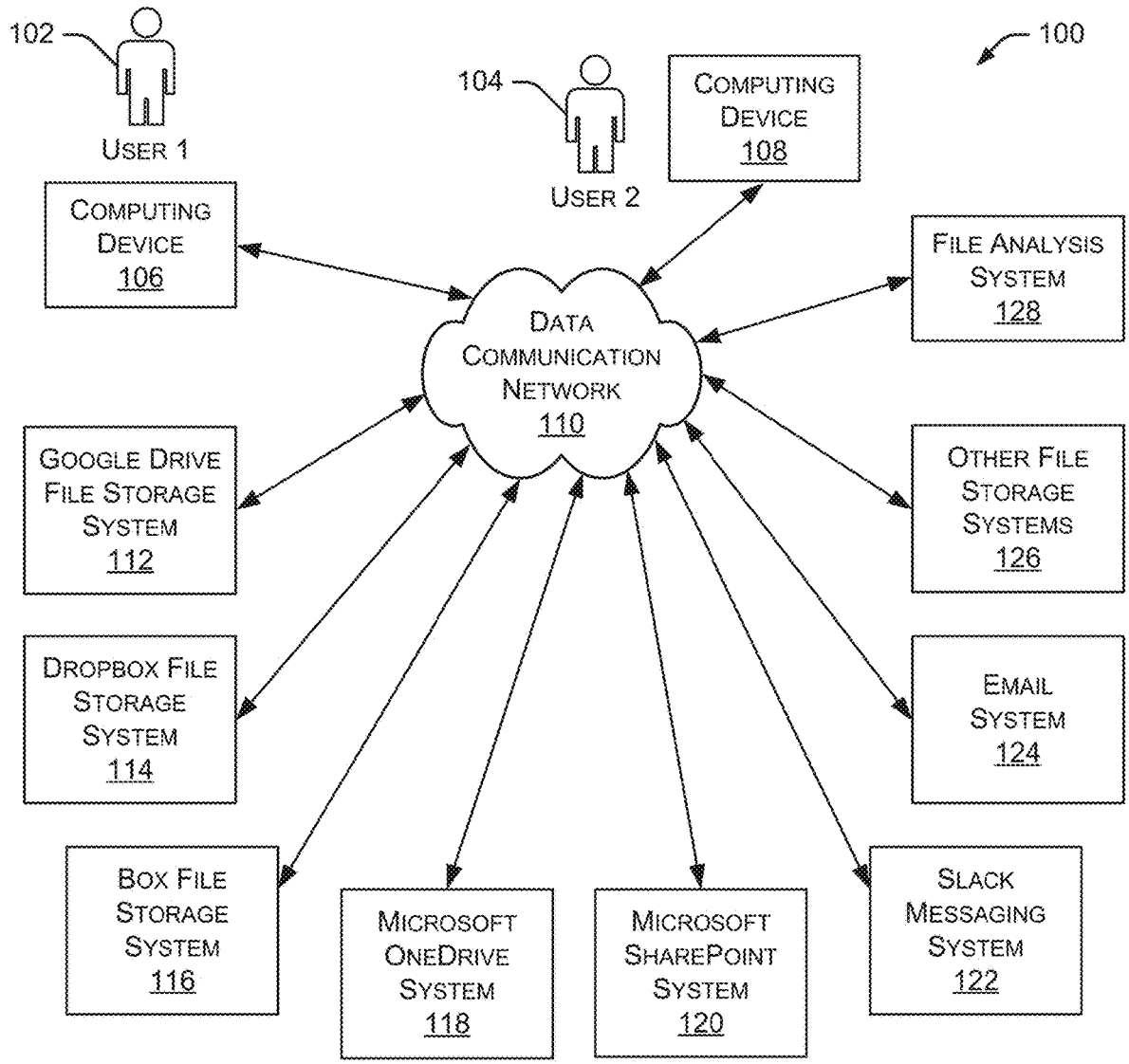
FIG. 1 depicts an environment within which an example embodiment may be implemented.

In the following disclosure, reference is made to various figures and drawings which are shown as example implementations in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The example systems and methods discussed herein are provided for purposes of illustration, and are not intended to be limiting. Embodiments of the present disclosure may be implemented in further types of devices, systems, and methods, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The file management systems and methods discussed herein provide various file analysis, file organization, file management, file characterization, file categorization, file clustering, and file collaboration functions in computing systems, such as cloud-based computing systems and cloud-based file storage systems. The described systems and methods are applicable to any type of file, document, or other data/information elements. As used herein, "file" refers to any document format (e.g., PDF, MS Word, MS PowerPoint, and text), any attachment (e.g., email attachment, message attachment, and other communication attachments), uploaded files, downloaded files, audio files, video files, photos, and the like. The term "document" refers to any of these types of files. In some embodiments, the described systems and methods function as a portal that provides an interface between one or more users and multiple file storage solutions, such as Box, Google Drive, Dropbox, Microsoft OneDrive, Microsoft SharePoint, and the like. In some embodiments, the described systems and methods function as a portal that provides an interface between one or more users and files exchanged via a communications solution, such as Gmail and other email services or Slack and other messaging services. The systems and methods allow users to access any number of files from any number of file storage systems or communications systems via the interface.

The described systems and methods use a unique hybrid method to identify clusters of similar files. A recognition sample is defined, which includes one or more key characteristics for a specific portion or aspect of a file (such as, for example, specific physical area of a page or a mathematical representation of selected file contents). The sample also contains instructions on how to extract those characteristics. Characteristics for each file to be evaluated are then heuristically compared to those of other files to form category clusters. This hybrid approach provides better accuracy and performance than either traditional recognition or heuristic algorithms, because recognition samples are informationally smaller than, and less variable than, the original files in their entirety.

In some situations, useful categories or collections of electronic files are based on the appearance of documents instead of their contents, such as collections including electronic forms or formatted letters. Proper analysis and recognition of an appearance-based category or collection typically requires a formal representation of visual effects and phenomena perceived by a human reader when looking at a document. In some embodiments, the systems and methods describe such effects and phenomena in a unique, formal, non-ambiguous grammar which allows human-created or computer-created descriptions of document appearance characteristics which are computer-interpretable.

The identification of useful categories or clusters of similar electronic files from within a larger collection may generate an arbitrary number of such clusters, depending on the particular characteristics of the collection and the nature of the similarities. In some embodiments, the systems and methods described herein detect all practical clusters within a vector-represented file collection, without a priori knowledge of the number of such clusters. Further, a given file may be a member of zero, one, or many detected clusters, and its affiliation to each of those clusters is not related to or dictated by its affiliation with others. This is a valuable and unique departure from traditional algorithms and approaches, which typically require membership in exactly one cluster (a partitioning of the collection), or require pre-definition of the number of clusters to be defined, or both. In some embodiments, the approach described eliminates an explicit step in the process of "training" the system, in which an expert typically reviews the entire set of files in advance to determine the number of clusters.

In some embodiments, the systems and methods described herein eliminate explicit training steps by clustering groups of files that are related in various ways and by automatically providing various selections from the clusters when soliciting user input (e.g., user selection of a category). These systems and methods reduce the number of training steps and may eliminate the need for an expert to identify and pre-select samples for a user training step. Additionally, the described systems and methods do not require performance of an explicit training process when new categories or new content sources are added to the system.

FIG. 1 depicts an environment 100 within which an example embodiment may be implemented. Any number of users 102 and 104 can communicate with any number of file storage systems (as well as any number of email services and messaging services) via computing devices 106 and 108. Computing devices 106 and 108 communicate with other systems via a data communication network 110. In some embodiments, data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network.

In the example of FIG. 1, computing devices 106, 108 can communicate with a variety of other devices and systems, such as a Google Drive file storage system 112, a Dropbox file storage system 114, a Box file storage system 116, a Microsoft OneDrive storage system 118, a Microsoft SharePoint storage system 120, a Slack messaging system 122, an email system 124, and other file storage systems 126. Computing devices 106 and 108 can also communicate with a file analysis system 128, as discussed herein. A particular user 102, 104 may interact with one or more of systems 112-126 depending on which services the user has subscribed or prefers to use. As shown in FIG. 1, each user 102, 104 may access one or more of systems 112-126 using any type of computing device 106, 108, such as a laptop computer, a desktop computer, a tablet, a mobile device, and the like.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
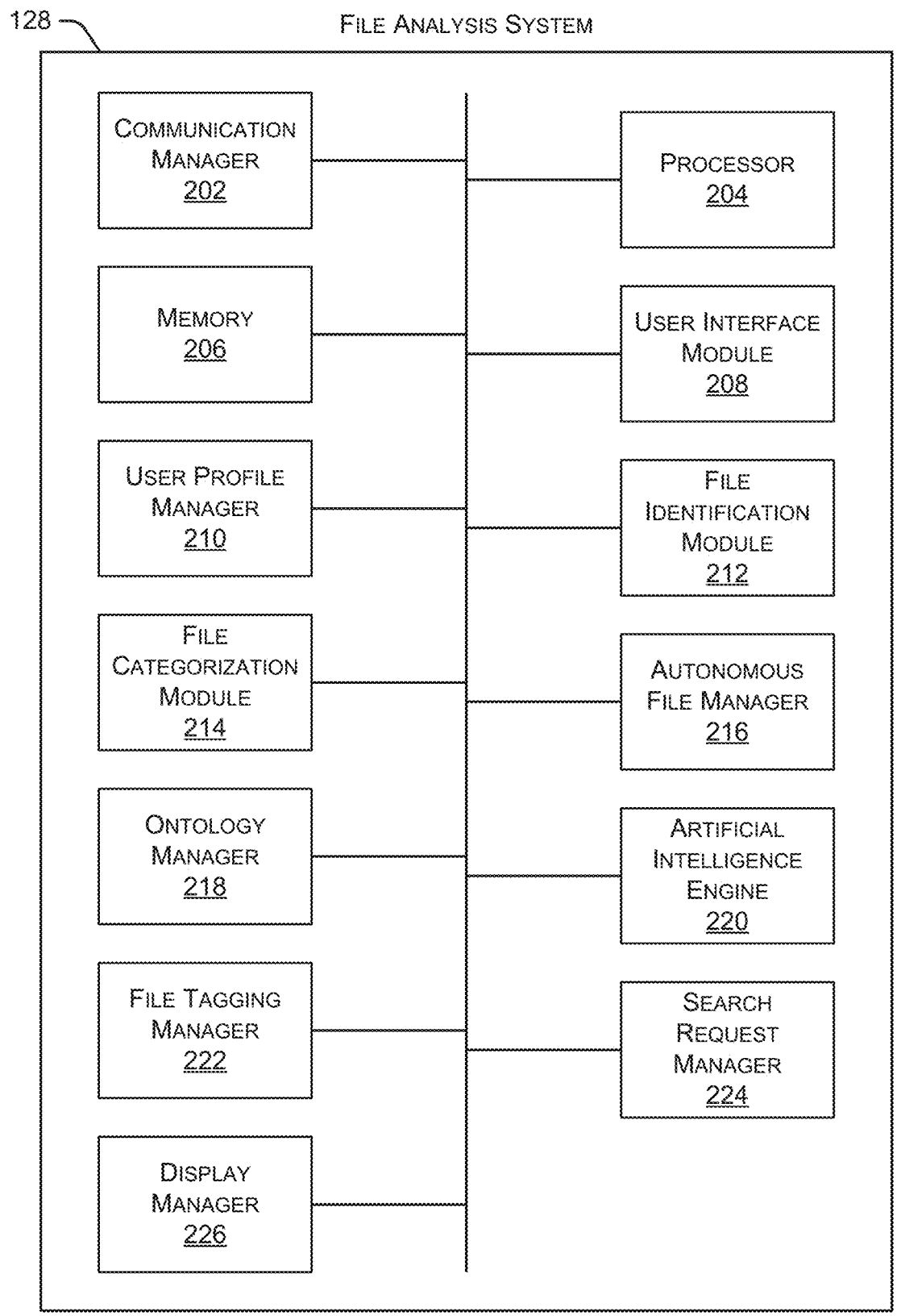
FIG. 2 is a block diagram depicting an embodiment of a file analysis system.

FIG. 2 is a block diagram depicting an embodiment of file analysis system 128. As shown in FIG. 2, file analysis system 128 includes a communication manager 202, a processor 204, and a memory 206. Communication manager 202 allows file analysis system 128 to communicate with other systems, such as the various systems discussed herein. Processor 204 executes various instructions to implement the functionality provided by file analysis system 128, as discussed herein. Memory 206 stores these instructions as well as other data used by processor 204 and other modules and components contained in file analysis system 128.

File analysis system 128 also includes a user interface module 208 that generates various user interface display components to communicate information to a user in the manner discussed herein. A user profile manager 210 maintains and manages various user information, such as user identity, user display preferences, user accounts with various systems (e.g., data storage systems, messaging systems, and email systems), and the like. A file identification module 212 is capable of identifying files and other documents on a variety of data storage systems, messaging systems, email systems, and the like. In some embodiments, file identification module 212 identifies files based on user preferences, system preferences, a search query, and the like.

File analysis system 128 further includes a file categorization module 214 capable of categorizing various files and other documents based on, for example, a document context and/or a business context. File categorization module 214 is also capable of characterizing files and other documents. Additional details regarding the categorization and characterization of files and other documents are discussed herein. An autonomous file manager 216 automatically categorizes (or suggests categories for) various files and other documents. An ontology manager 218 manages any number of industry-specific ontologies that are used to automatically categorize (or suggest categories for) files and other documents, as discussed herein.

File analysis system 128 also includes an artificial intelligence engine 220 that assists with autonomously or semi-autonomously categorizing files or documents into semantically meaningful business categories, such as status reports, budgets, proposals, advertisements, RFPs, meeting notes, and the like. A file tagging manager 222 handles the association of context tags or attributes with various files and documents. A search request manager 224 handles the processing of search requests (e.g., requests for a particular file, document, or other information). A display manager 226 manages the display of information (e.g., the results of a search request) to a user or other system.

It will be appreciated that file analysis system 128 shown in FIG. 2 is given by way of example only. Other embodiments may include fewer or additional components without departing from the scope of the disclosure. Additionally, illustrated components may be combined or included within other components without limitation.

Figure 3:
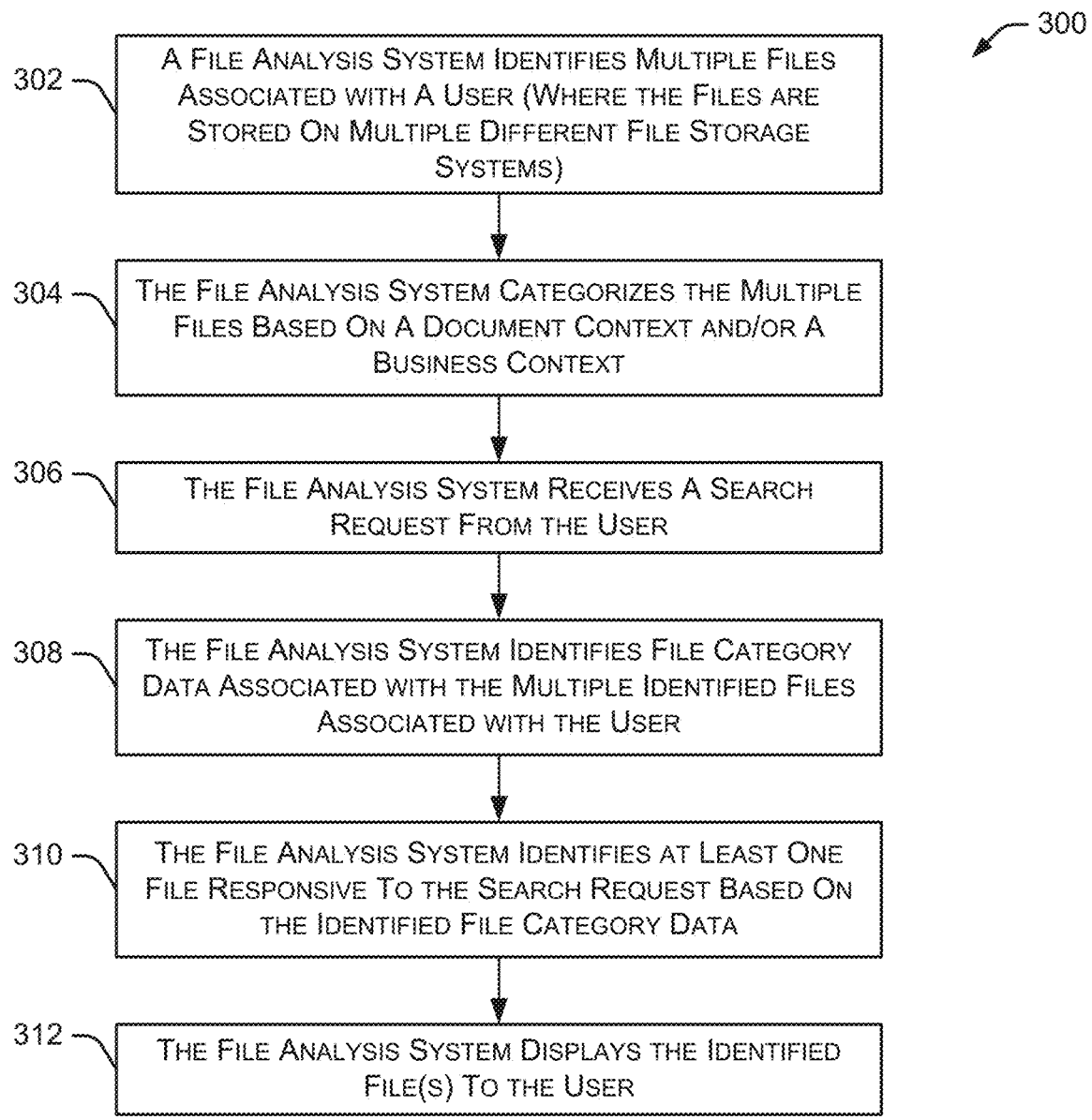
FIG. 3 is a flow diagram depicting an embodiment of a method for analyzing and displaying multiple files from multiple sources.

FIG. 3 is a flow diagram depicting an embodiment of a method 300 for analyzing and displaying multiple files from multiple sources. Initially, a file analysis system (e.g., file analysis system 128 shown in FIGS. 1 and 2) identifies 302 multiple files associated with a user where the files are stored on different file storage systems and other types of systems. As discussed above, the multiple files may be stored on any number of file storage systems, messaging systems, email systems, and the like. The file analysis system categorizes 304 the multiple files based on a document context and/or a business context, as discussed in greater detail below. This categorization 304 generates file category data associated with the files that belong to (or are associated with) the user.

In particular implementations, the described systems and methods also characterize files (e.g., certain files may be characterized as containing images of people, referring to a location such as Los Angeles, referring to a particular person, referring to a particular organization, and the like) and may relate multiple files to one another (e.g., a specific collection of files are related to "Project X", a group of files are associated with a particular customer, and the like). In some embodiments, multiple related files are not necessarily associated with the same category. For example "all files related to Project X" will typically not consist of files that share the same category. Instead, "all files related to Project X" is presented as a context or characterization of the group of files. The systems and methods described herein may use categories and/or characterizations with any file. Any discussions herein related to file categories may apply equally to file characterizations. For example, a particular file may be categorized as a "contracts" file and be characterized as related to client XYZ, with a status "In Review."

In some embodiments, a user submits a search request (also referred to as a search query) to identify a particular file or other information. Method 300 continues as the file analysis system receives 306 a search request from the user. In response to receiving the search request, the file analysis system identifies 308 file category data associated with the multiple identified files associated with the user (e.g., the file category data generated at 304). Method 300 continues as the file analysis system identifies 310 at least one file responsive to the search request based on the identified file category data. Since the file category data is generated based on document context and/or business context, use of the file category data allows the file analysis system to identify files having a proper context with respect to the search request. Finally, the file analysis system displays 312 the identified file(s) to the user. For example, the identified file(s) may be displayed via a user interface. The "display" of the identified file(s) may include a file name, file icon, or other information representing the file. In other embodiments, information regarding the identified file(s) may be communicated to another system or device for processing, display, and the like.

In some embodiments, the described systems and methods include an artificial intelligence (AI) engine (such as artificial intelligence engine 220 in FIG. 2) configured to autonomously or semi-autonomously categorize files or documents into semantically meaningful business categories, such as status reports, budgets, proposals, advertisements, RFPs (Requests For Proposals), meeting notes, and the like. A user can access and edit files or documents via a user interface (referred to herein as an "interface"), and save the files or documents back to the respective file storage system. Additionally, the systems and methods described herein allow the user to simultaneously search, via a single interface, for files and documents across multiple file storage systems and across multiple accounts for each file storage system. Thus, the user is not required to remember which file storage system stores a particular document. The user can enter a single search term (or search phrase) and the systems and methods search all file storage systems available to the user to locate the user's desired file(s) or document(s).

The interface described herein is also capable of organizing multiple files and documents by category, by business context (such as files related to a particular project, supplier or issue), or any other structured parameter (such as approval status, due date or department) or tag. In some embodiments, the systems and methods provide context tags or attributes associated with the files and documents, such as "urgent", "approved", "due on September 25", and the like. In particular embodiments, the described systems and methods include an artificial intelligence (AI) engine configured to autonomously or semi-autonomously apply a contextual tag or attribute value, and to characterize the business context of particular files or documents.

In some embodiments, the described systems and methods automatically suggest categories and contexts based on the user's files, based on a combination of proprietary industry-specific ontologies and the user's actual file contents. The proprietary ontologies capture best practices for organizing, classifying and characterizing files and documents, based on manual document organization implemented by dozens to hundreds of organizations for each supported industry. For example, specific ontologies exist for marketing agencies, real estate operators, law firms, non-profit organizations, technology companies, educational institutions, medical institutions, and the like. There are also general business ontologies that are relevant to multiple types of businesses. A particular ontology, such as a law firm ontology, may include work organization (by matter, by client, by office, etc.), roles (plaintiff, defendant, attorneys, etc.), activities (hearings, conferences, etc.), types of files or documents (motions, pleadings, subpoenas, depositions, transcripts, judgments, orders, etc.), document characteristics (date, status, document type, etc.), and the like. The law firm ontology may also include information regarding the relationships between each type of file and work organization, roles, activities, other files, and the like.

In a semi-autonomous approach to categorizing files, suggestions are presented to the user, and once accepted, are subsequently used by the system to categorize and characterize files and documents. With each suggestion, the system learns more about the user's files and workflow, and becomes a more intelligent assistant. The user's files do not move between different file storage systems and are not consolidated to a single file storage system. Instead, the user can access their files via a system interface that communicates with the file storage system on which the files are stored (e.g., Dropbox, Google Drive, or Box). Additionally, the user can drag and drop files on their computer, sync folders to their computing device, and the like. Thus, the user can work with files in the same manner they are comfortable with when using their existing user interface.

The described systems and methods respect the security set up in Dropbox, Drive, Box, Gmail, OneDrive, SharePoint, Slack, and similar storage and communications systems, such that each user sees only what they are authorized to see, and can download, upload or change files based on permissions in the storage/messaging/communication system. Each user's access to the combined body of files and documents is dynamically security-filtered on a per-user basis, while maintaining a responsive user interface. The system automatically synchronizes files and other data between the user's computing system and the file storage system. The systems and methods help users (and teams) save time, find files more efficiently, work with files in context, and collaborate more effectively. This lets the user focus on their business activities instead of searching and browsing to find files and other documents.

Multi-Rule Categorization and Characterization Suggestions with Exponential Decay The described systems and methods employ multiple heuristic rules for suggesting classifications, attributes and tags for files (such as "these are Contracts", "these are Resumes", "the Effective Date for this Contract is Jan. 1, 2018", "these files are Important", "these are Urgent", and the like). The rule-set is expanding over time, and various rules have different levels of predictive power for different types of suggestions. The system takes into account all of the rule predictions and allows evidence from multiple, less predictive rules to be aggregated into a higher-confidence suggestion than a single rule driving a different suggestion.

To achieve this, the system's suggestions engine's confidence scoring formula combines the results of multiple rules to produce an aggregate confidence score for a given suggestion. The confidence score, SFile, is a numerical value between zero and one ($0<SFile<=1$).

Each rule is assigned a "rule confidence factor", Cr, between zero and one, based on the historical experience with the predictive power of the rule. The aggregate confidence score, SFile, for a given file and a particular candidate suggestion is computed as:

$$SFile = K^*((d0^*C1)+(d1^*C2)+(d2^*C3)+ \ldots (dN-1^*CN))$$

where:

N is the number of total rules the system is using (e.g., 4)

C1 is the rule confidence factor for the highest-confidence rule that "fires" for this file and candidate suggestion pair C2 is the rule confidence factor for the second highest confidence rule that "fires" for this file and candidate suggestion pair CN is the rule confidence factor for the Nth highest confidence rule that "fires" for this file and candidate suggestion pair d is a decay factor ($0<d<1$) which causes the impact of each additional firing rule to be marginally decreasing (i.e., the first rule "counts" more than the second rule, etc.) In some embodiments, the system uses $d=\frac{1}{2}$, so $d0=1$, $d1=\frac{1}{2}$, $d2=\frac{1}{4}$, $d3=\frac{1}{8}$. The value of d may be fixed at any point in time, but it can be adjusted over time to raise or lower the impact of multi-rule "hits".

K is a "normalizing constant" ($0<K<1$) which insures that S lies between zero and one. The appropriate value for K can be calculated from N (the number of rules), C1 through CN (the confidence weightings for each rule), and d (the decay factor), such that a file that satisfies every rule for a given category produces an aggregate score (S) of 1.

As described above, an SFile score is computed for each candidate suggestion for a given file. For that file, the user interface will display, for the user's acceptance or rejection, the suggestion with the highest SFile score. If the user rejects that suggestion, the suggestion with the next-highest SFile score is there, ready to be suggested.

Tag Promotion for Semantic File Classification and Characterization

The described systems and methods capture the semantic meaning of files within a user's repository, and the semantic relationships among files and various business objects, using several semantic tools:

File Categories, which classify files according to their business role ("Contracts" vs. "Resumes" vs. "Proposals", etc.)

Attributes, which capture in a uniform way, key characteristics of files, such as an Effective Date for a Contract, or the Region associated with a Sales Order. Some of these attributes offer single- or multiple-choices among specified values (such as a State attribute, or an Approval Status attribute).

Business Contexts, such as "Projects" or "Clients" or "Products", to which files and documents are related. The described systems and methods can answer questions like "Show me the Brief and Status Reports for this specific Project", or "show me all of the documents in the past six months related to our client BMW".

For most organizations, diving directly into these rich forms of metadata, capturing valuable semantic information, is too big of a step. What users are familiar with, well-trained by services such as Twitter and Instagram and other consumer products, is simple tagging.

The systems and methods uniquely create a smooth on-ramp and evolution to higher forms of semantic modeling by encouraging simple, free-form tagging of files and/or folders, and then allowing straightforward promotion of simple tags into the more complex metadata structures described above. The systems and methods monitor the pattern of tagging, and based on industry-specific dictionaries, suggest that tags be promoted. These promotions include:

Simple Tag to File Category: the user starts out tagging various files "Contract", to indicate that they are contracts. Over time, it's clear that "Contract" should be a category of file, with its own standard attributes, such as Effective Date, Counterparty, Assigned Attorney, etc. The systems and methods support direct transformation from tag to category.

Set of Simple Tags to Single-choice or Multi-choice Attribute Values: the user starts out tagging some files "Asia", and others "Europe" and others "North America". Over time, it's clear that "Region" should be an attribute that can be applied to various files to aid in characterizing them, with a permitted set of valid choices. The systems and methods support direct transformation from a set of tags to a named Attribute (single-choice or multi-choice), with the tags as valid option choices.

Simple Tag to Business Context: the user starts out identifying some of their folders as "Project Folders", by tagging them "Project". Over time, it's clear that files associated with a given project may be scattered across multiple folders, or even across multiple cloud accounts (Box, Dropbox, Gmail, etc.). The systems and methods support direct transformation from a tag into an abstract business context (like a Project, or a Client), to which files from across the system may be related. The transformation takes into account the names of the tagged folders, and transforms them into the associated abstract entities ("Projects" in this example).

Set of Simple Tags to Business Context Instances (Business Objects): the user starts out tagging some of their files and/or folders "iPhone X", and others "Watch", and others "iPad Pro", etc., to indicate that they are related to those three different Products. Over time, it's clear that those are actually three Products, each of which has its own attributes (Selling price, year of introduction, annual volume, and the like). The systems and methods support direct transformation from a set of tags to a named business context ("Products" in this example), with individual business object instances (an iPhone X Product, a Watch Product and an iPad Pro Product), and relates the previously-tagged files and folders to those products.

Each of these transformations can be thought of, and is presented to the user as, a "promotion" of a simple tag (or set of tags) into a more structured, semantic "tag", which is, in effect, the File Category or Business Object and relationships to them.

Tag Identification/Entity Detection Service Integration into a Structured Metadata Model In some embodiments, the systems and methods described herein use existing third party web services (e.g., AWS (Amazon Web Services), Google, Wikipedia, etc.) to automatically identify potential tags for documents processed by the system, and to detect entities (organizations, dates, people, locations, etc.) mentioned in document titles or text. The system integrates this relatively unstructured information with its metadata model for a given user account, and automatically populates structured metadata from it. For example, the systems and methods described herein may create suggested attributes to be applied to a document, or suggest that the document is related to an existing Customer or a Supplier, or that the document should cause suggestion of a new Customer, or even a new business context, such as a "Partner". The intelligent "bridging" of unstructured tools to extract relevant "information snippets" from a document with a structured business model of the account (Customers, Suppliers, Projects, Products, etc.) is unique to the described systems and methods.

Automatic Identification of File Collections with Common Characteristics

In some embodiments, the systems and methods analyze the files from cloud storage, email attachments, and other sources to identify collections or clusters of files which share specific characteristics. The systems and methods employ several forms of analysis, considering the text content of files; various filtered forms of text content (e.g., excluding common words, focusing only on terms of art); the overall layout or "shape" of a file; and identifying characteristics such as headers, logos, footers, and headings. The resulting analyses are vectorized and proximity algorithms are applied to identify potentially relevant collections of files. The systems and methods reconcile the collections identified by the various analyses and present potentially meaningful clusters to the user for action that captures the semantic relationship. In some situations, the system may suggest that the files in a collection should be placed in an existing file category or a new file category. Additionally, the system may suggest that the files in a collection should be assigned common attribute values to capture their similarity, or that the files should all be related to a business context such as a common project, supplier or product. This set of capabilities identifies semantic meanings which may not be captured in the system's existing ontologies, and thus expands the quality of its semantic description of the file collections. The systems and methods employ an artificial intelligence (AI) engine to learn from the user's responses to the identified file collections, and improve the quality of suggested file collections as it operates.

Integrated Presentation of Files from Cloud Storage, Email Attachments, and Instant Message Uploads The described systems and methods support Gmail as a "file content source", alongside Dropbox, Google Drive, Box, OneDrive, SharePoint, messaging systems, and the like. As discussed herein, the described systems and methods support multiple types of services, such as data storage services, instant messaging services, communication services, email services, and the like. For emails and instant messages (IMs), the systems and methods "turn the traditional model upside down", with an attachment-centered (e.g., file-centered) approach to looking at account contents instead of a message-centered approach. An attached file is presented to the user in the same way that a file from cloud storage is presented, and the set of emails or IMs to which it is attached is a part of the metadata for the file. The systems and methods combine multiple emails or IMs that transmit the same file into a single view of the file, which includes information about all the messages to which it was attached. Thus, the described systems and methods provide automatic detection and de-duplication of information, and provides a unified user interface for viewing files, spanning cloud storage, cloud email, cloud IM solutions, and other systems and services.

The systems and methods discussed herein further support the incremental accumulation of changes to the files and file data (such as file categories, business contexts, and the like) without having to re-examine the entire file corpus. In some embodiments, the systems and methods provide incremental analysis of newly uploaded, shared, emailed, or messaged files to suggest new organizing structures (e.g., new file categories or business contexts), and presents suggested changes to the logical structure over a period of time. This is an improvement over existing systems and techniques that typically require a large, upfront "training" phase that is distinct from the "operational" phase. The systems and methods described herein accumulate training data incrementally as users interact with its suggestions and work with (and collaborate on) new files in the ordinary course of business.

Some cloud management systems support sharing of an individual file or folder with one or more other users by providing a "share link" (via email or other communication method) for the targeted user(s) to access the shared content. The systems and methods described herein allow a user to share logical collections (or groups) of files for collaborative work. For example, a user may share an "All Case Studies" collection with other users regardless of where the individual files in the collection are located. In some situations, the "All Case Studies" collection may include different types of files from different systems (e.g., multiple file storage systems, email systems, messaging systems, and the like). Example collections to be shared may include "all files related to Project X," "all Status Reports related to Client XYZ in the past quarter" or "all images that contain automobiles." This sharing of file collections improves collaboration between users and the sharing of files regardless of where the individual files are actually stored.

Figure 4:
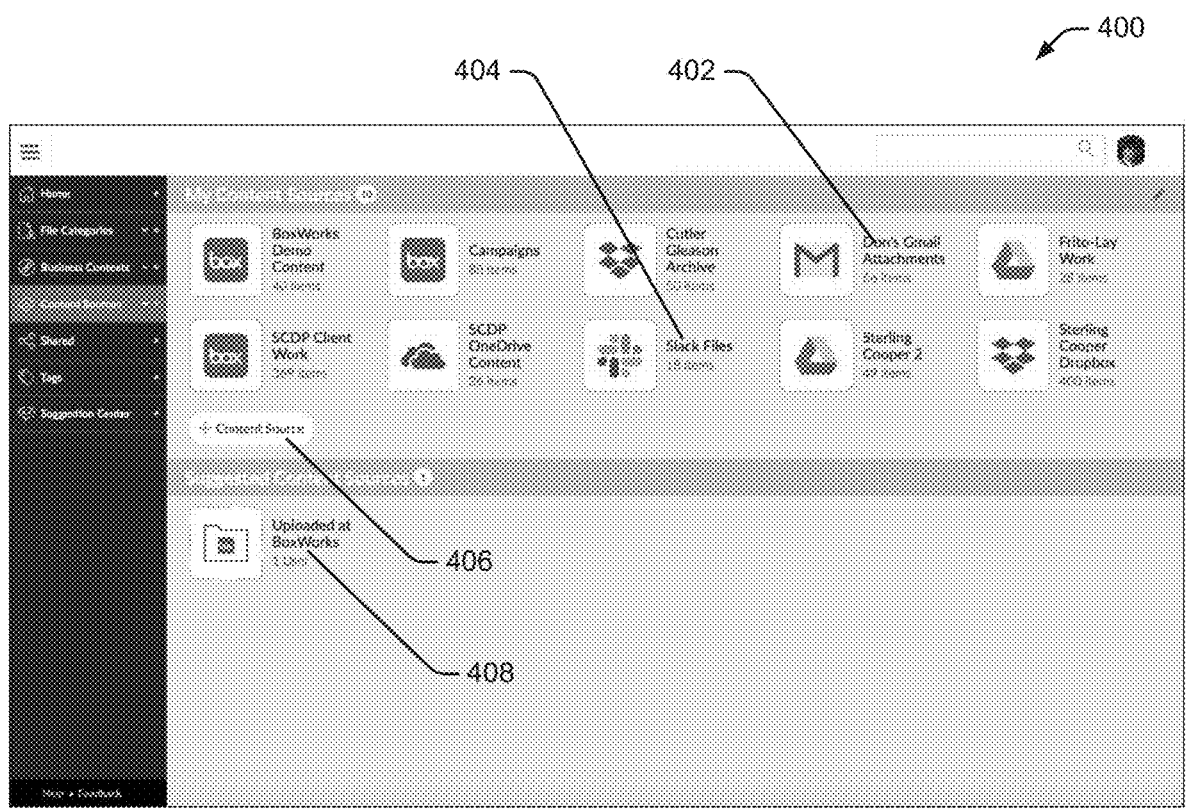
FIGS. 4-17 illustrate example user interfaces generated by or associated with the systems and methods described herein.

FIGS. 4-17 illustrate example user interfaces generated by or associated with the systems and methods described herein. FIG. 4 illustrates an example user interface 400 identifying files that are stored on multiple different storage systems. For example, the files may include email attachments 402 stored on an email storage system, messenger attachments 404 stored on a messenger storage system, and other files stored on systems associated with Dropbox, OneDrive, and the like. A content source 406 presents a physical view of the files based on where they are stored. Additional folders are easily connected as necessary as illustrated by the suggested content source 408.

Figure 5:
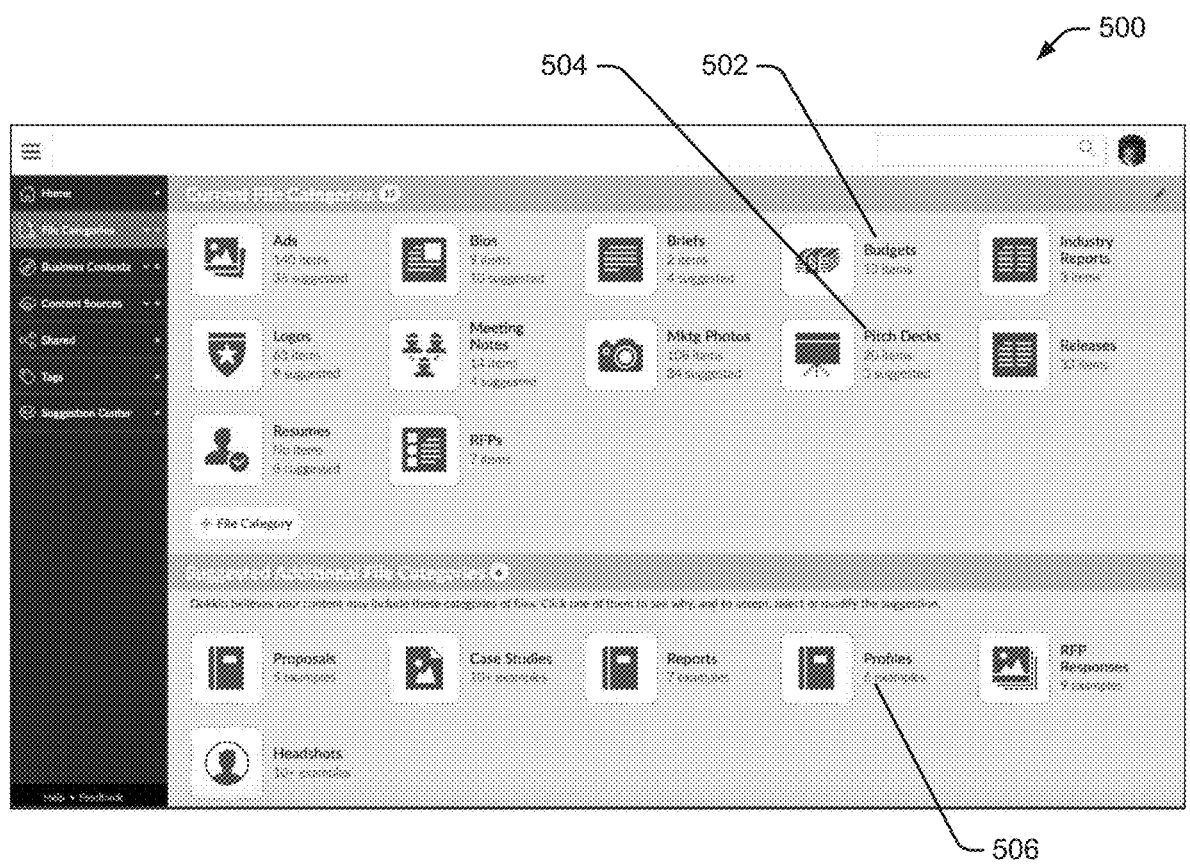

FIG. 5 illustrates an example user interface 500 identifying various categories and category suggestions. For example, 13 files are associated with a budget category 502. A pitch deck category 504 includes 20 files as well as three additional files that are suggested for pitch deck category 504. In addition to the file categories (which may be user-confirmed), the described systems and methods may automatically examine a user's files to find evidence of other (additional) file categories, such as the suggested profiles category 506. In some embodiments, the systems and methods described herein combine one or more ontologies with entity detection and machine learning models to suggest additional entities based on the file corpus. These suggestions may be associated with one or more business contexts. Additionally, the systems and methods may examine a user's files to identify other potentially useful contexts, such as viewing files based on a project or a team.

Figure 6:
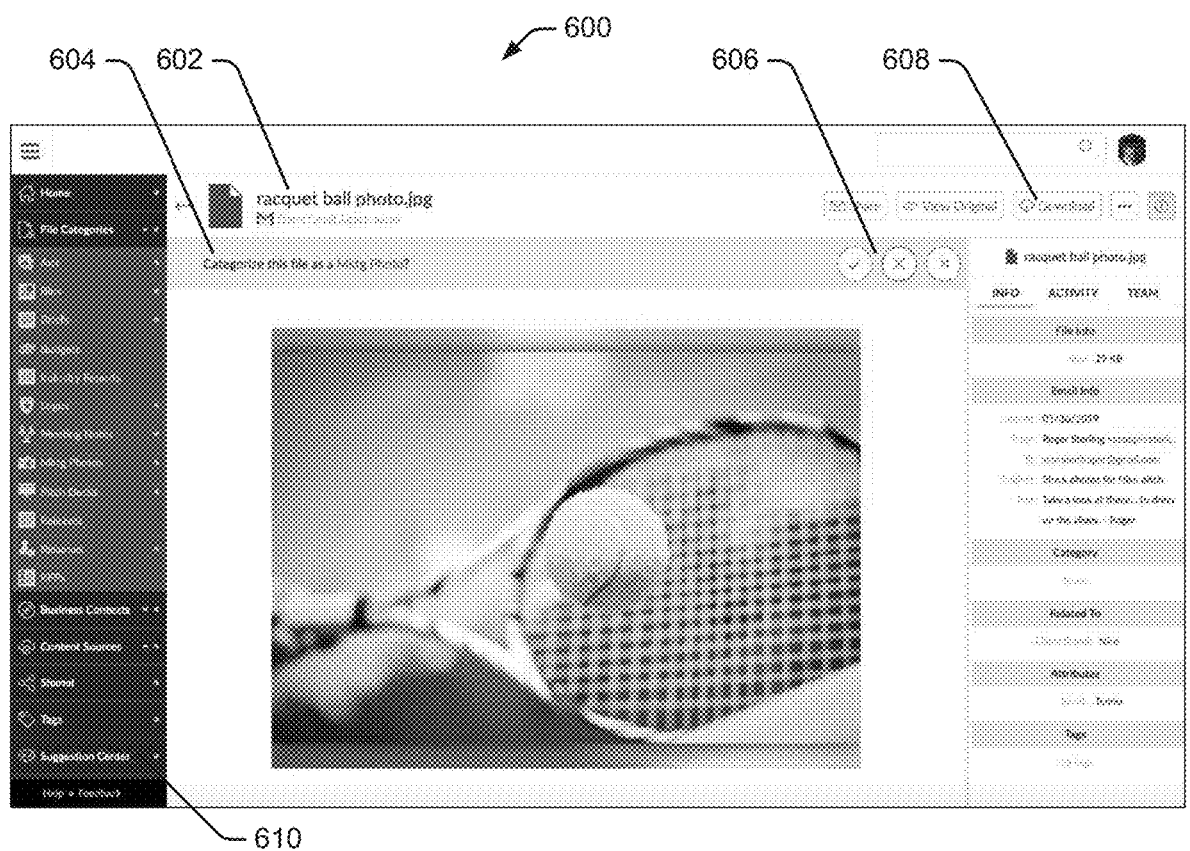

FIG. 6 illustrates an example user interface 600 identifying various suggested categorizations. For files, the user interface provides a preview 602 of the file's contents and the file's location within one of the content sources. The described systems and methods also suggest 604 how to categorize a particular file based on a combination of factors (e.g., file name, parent and ancestor file names, sibling files, file contents, and the like). Action buttons 608 allow the user to process the file and acceptance buttons 606 allow the user to accept or reject the suggested categorization 604. In some embodiments, a suggestions center 610 allows further processing of categorization suggestions.

Figure 7:
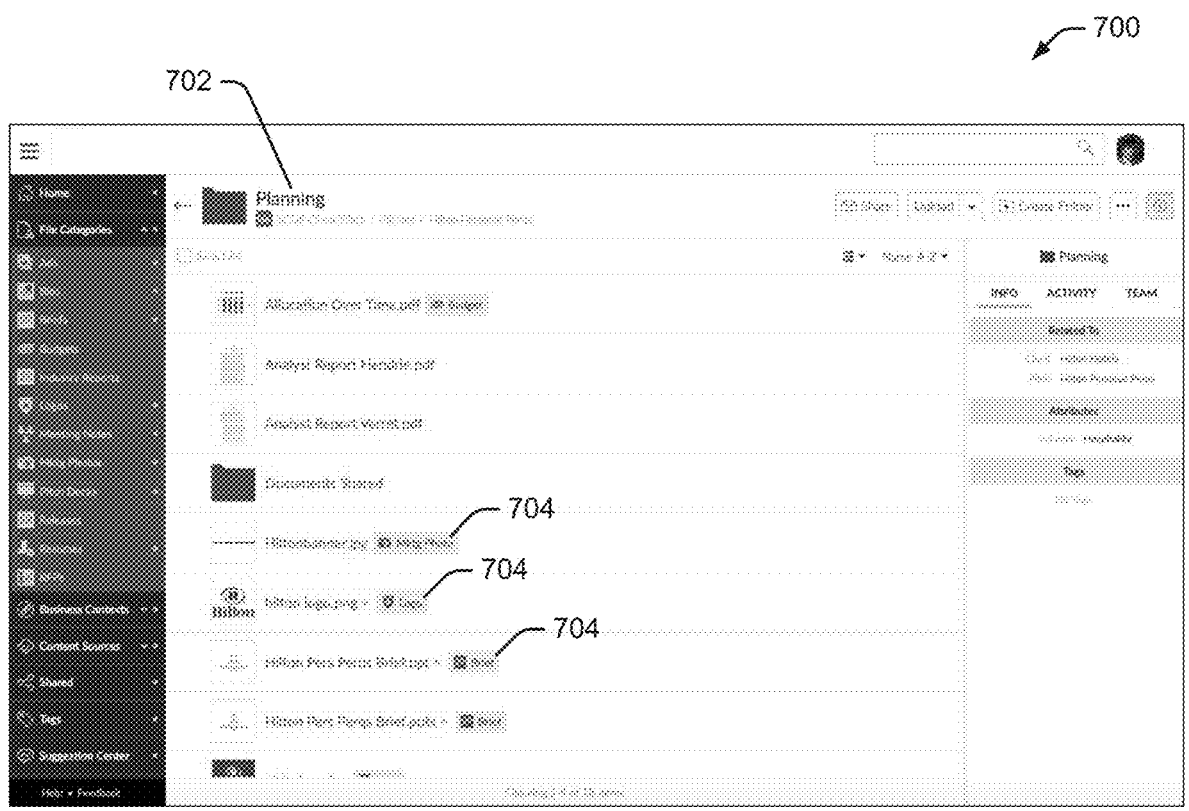

FIG. 7 illustrates an example user interface 700 identifying various file categorizations. For a folder 702, the user interface shows the folder's contents and location within a particular content source. Action buttons (such as "Create Folder") allow the user to process a particular folder. The right panel of the user interface shows contextual information about the folder, such as the client or pitch that it relates to and any applied tags. The categorization of individual files 704 within the folder may be shown as a series of "badges."

Figure 8:
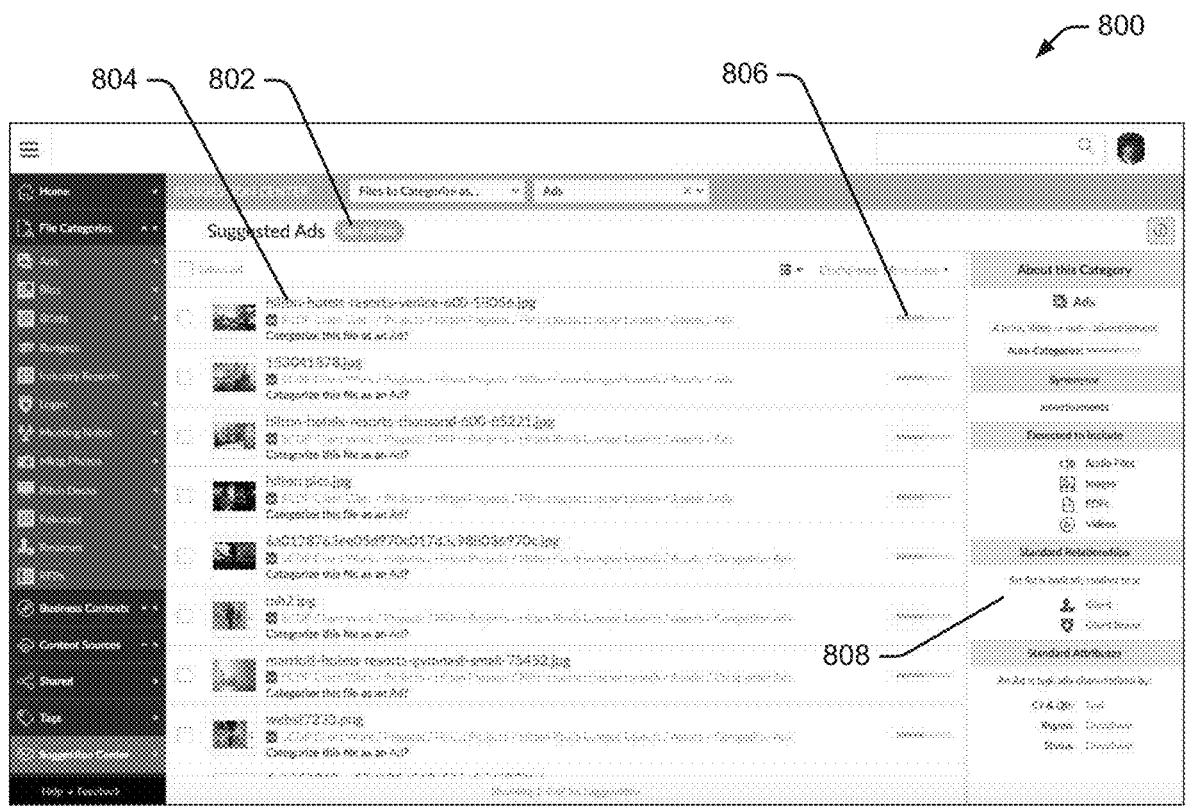

FIG. 8 illustrates an example user interface 800 identifying an example suggestion for categorizing one or more files. The described systems and methods have examined multiple files and suggests that the files should be categorized 802 as ads. Multiple example ads 804 are shown along the left side of the user interface. A weighted confidence 806 is associated with each example ad. Weighted confidence 806 is determined by considering one or more rules to determine whether a file is likely to be an ad. Various ontologies 808 and other customizations help define the file category, including synonyms for the category name, what types of files the category typically includes, and how files in the category are typically related to various business contexts and the associated attributes they typically have. In some embodiments, a suggestion center allows a user to toggle between different types of suggestions. The suggestion center may present suggested categories, contexts, entities (e.g., projects and clients), file relationships, tags, and the like.

Figure 9:
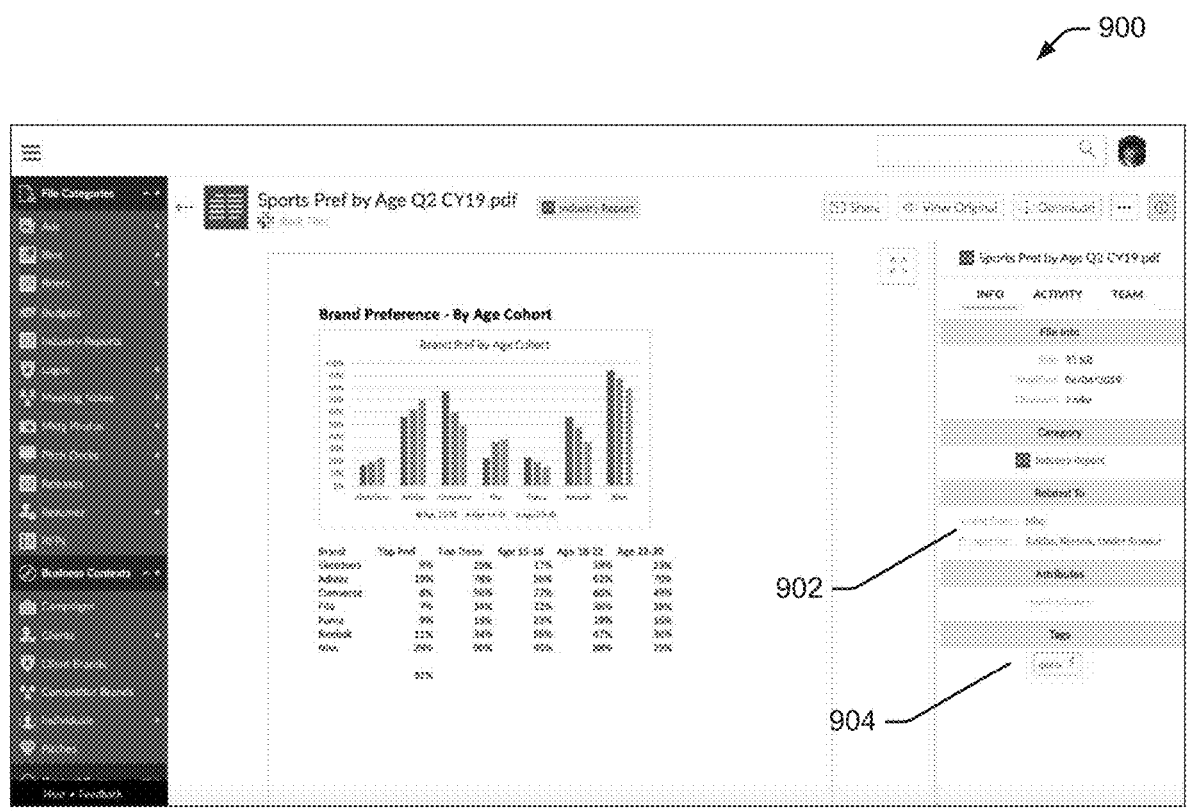

FIG. 9 illustrates an example user interface 900 identifying file contents 902. As shown in FIG. 9, the systems and methods examine file contents to determine mentions of Adidas, Reebok, Nike, and Under Armour—one of which is a client brand and the other three are competitor brands. The systems and methods may automatically apply a tag 904 "sports" to the file to make it easier to find, organize, and use.

Figure 10:
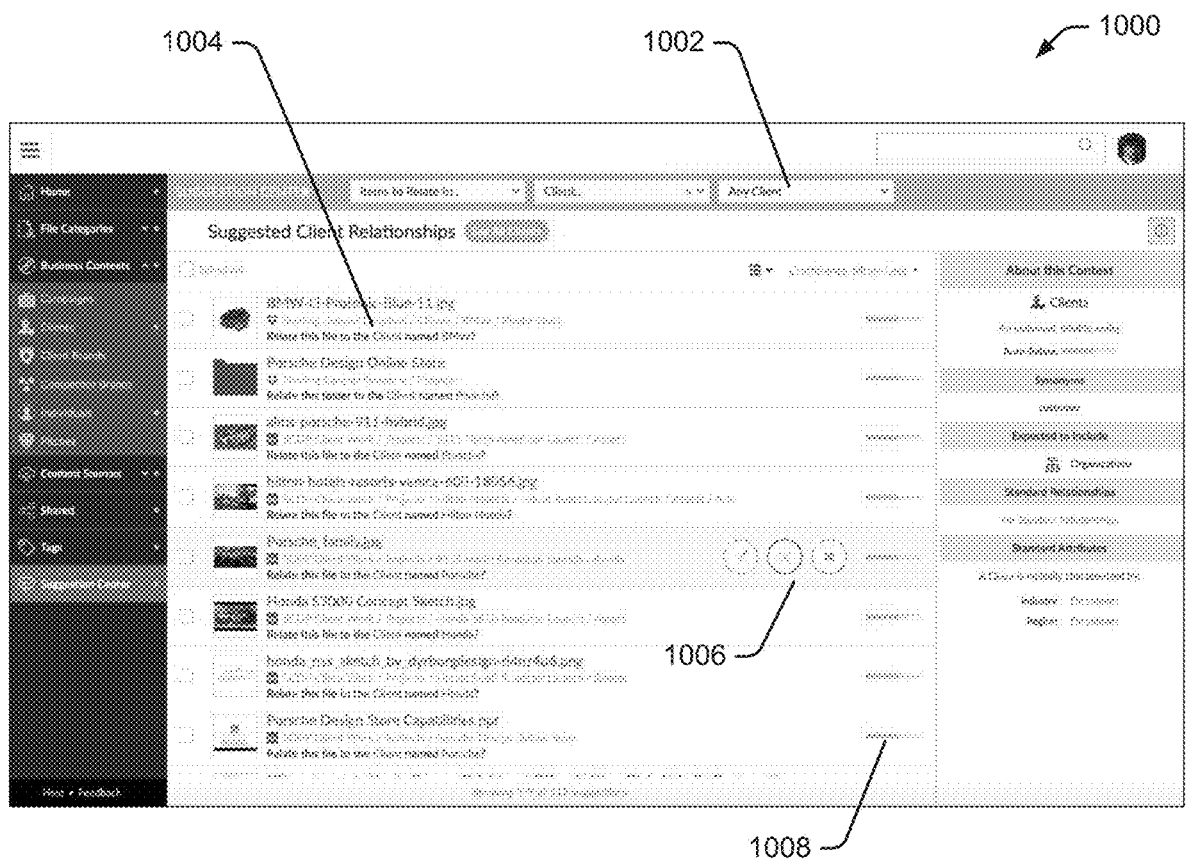

FIG. 10 illustrates an example user interface 1000 identifying various suggestions. A box 1002 identifies that the user interface is displaying files 1004 related to various Clients. Suggestions to train the systems and methods that generate suggestions are approved or rejected by the user via buttons 1006. A confidence level 1008 is calculated and displayed to the user to build the user's confidence in the suggestion and encourage the user to entrust more decision making to the described systems and methods.

Figure 11:

FIG. 11 illustrates an example user interface 1100 identifying a list of categorized files. This user interface is showing all files that have been categorized as marketing photos 1102. Additionally, the described systems and methods may suggest 1104 other files that should be categorized as marketing photos. The list of categorized files shown in FIG. 11 can be filtered 1106 based on various filter parameters. The individual files 1108 are listed along with their locations to support user needs that start with "I need to find a marketing photo that . . . ."

Figure 12:
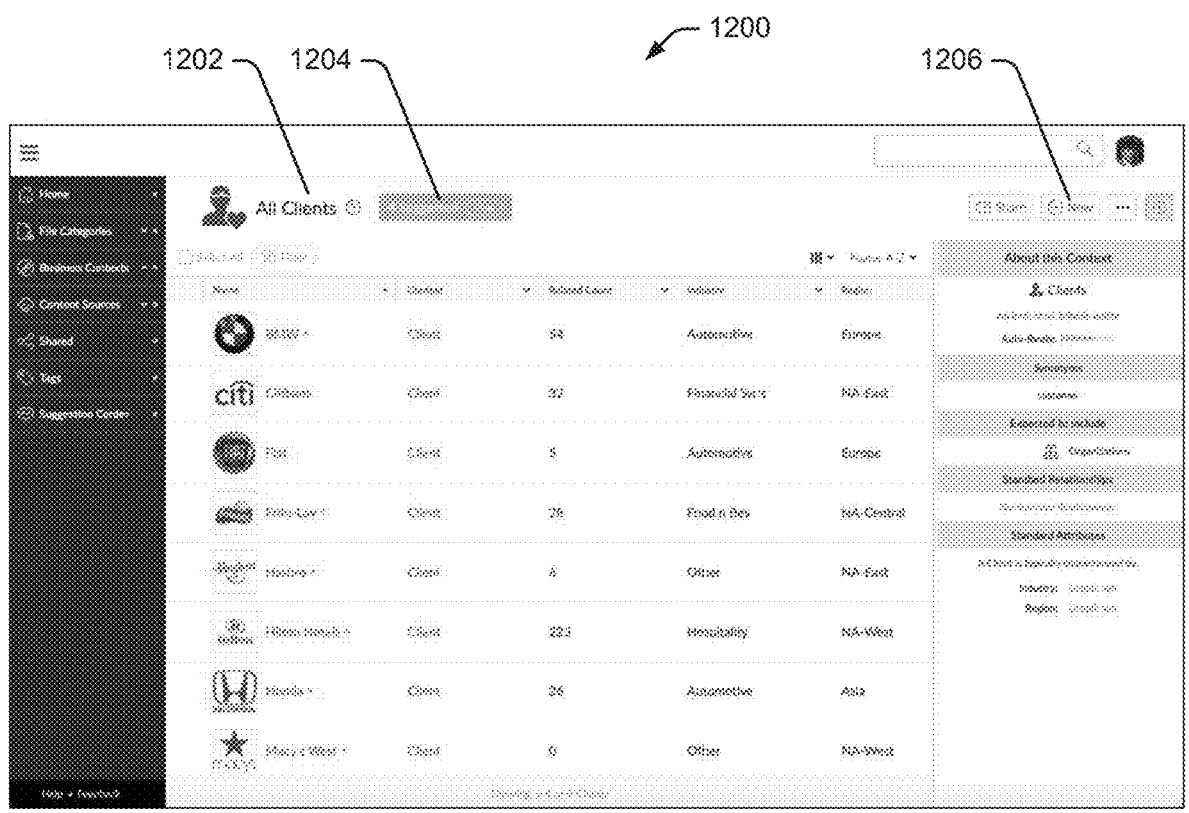

FIG. 12 illustrates an example user interface 1200 identifying a list of business entities (e.g., clients). In the example of FIG. 12, the user interface displays an organization's clients 1202 and suggests new clients 1204 based on mentions in the connected files that indicate these companies may be clients. A new client button 1206 allows a user to manually add a new client. In some embodiments, the individual clients are listed along with how many files or other items are associated with each client. The systems and methods may also identify client attributes such as industry or headquarters region.

Figure 13:
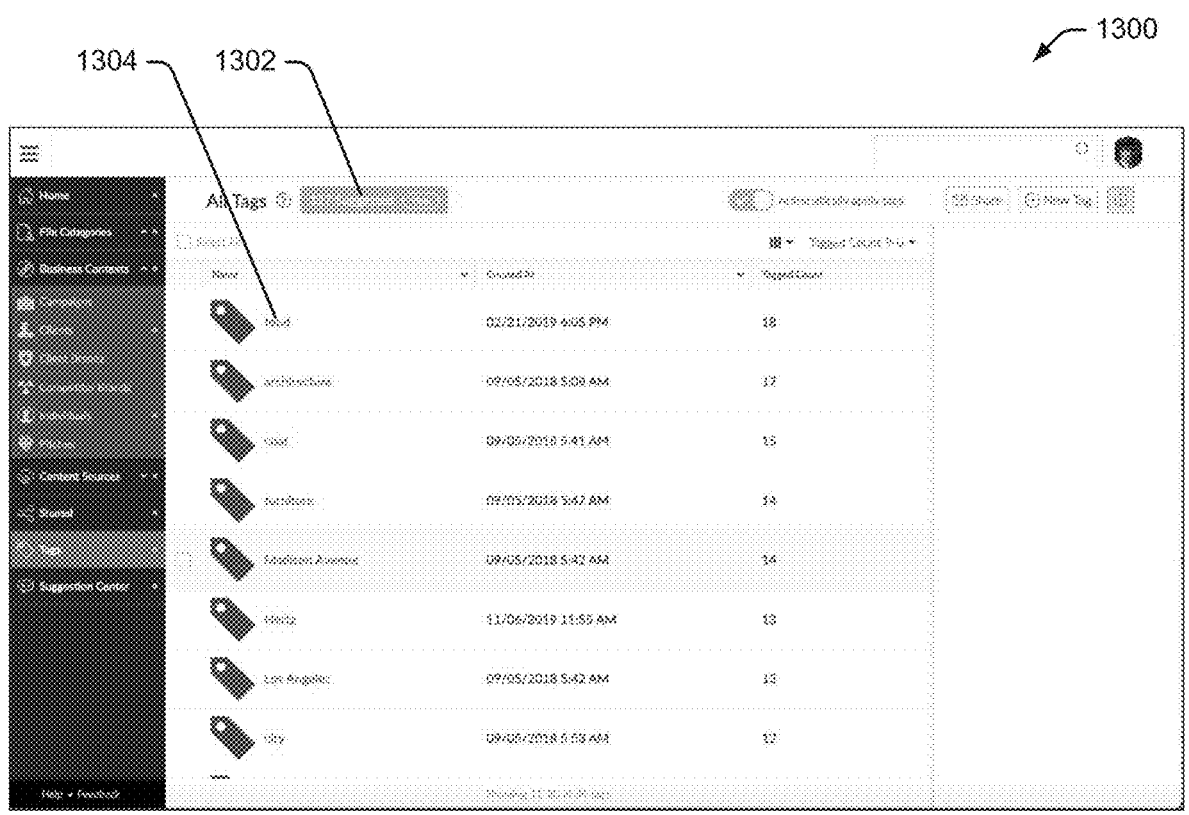

FIG. 13 illustrates an example user interface 1300 identifying tagging of various files. As discussed herein, the systems and methods support tagging to capture less structured, but still important information to characterize files, organize files, and easily find files. The systems and methods suggest 1302 tags based on, for example, the file content. Tags 1304 are flexible and can identify, for example, all files that contain an image of a flood, particular architecture, or refer to a particular company or organization. When a user accepts a tag suggestion (or starts to manually tag files), the described systems and methods may automatically tag additional files (where appropriate).

Figure 14:
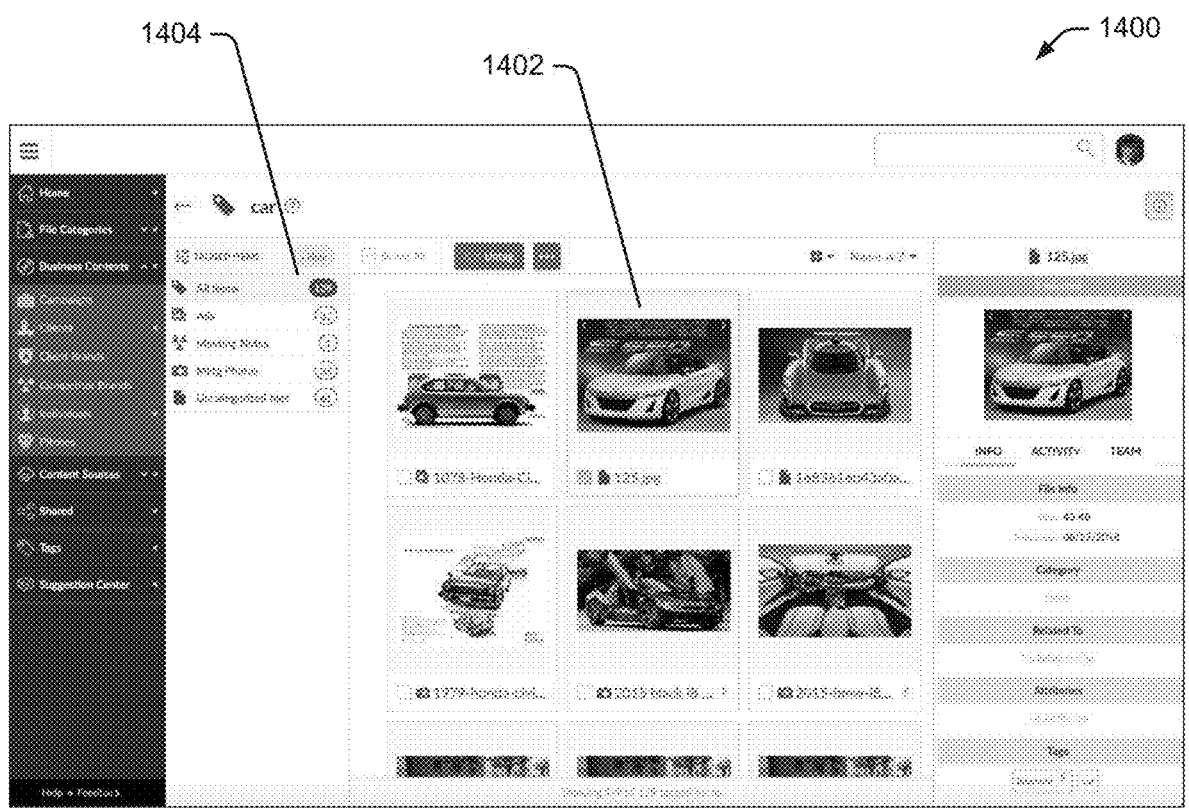

FIG. 14 illustrates an example user interface 1400 identifying automatic tagging of files. In this example, a tag "car" is being used to automatically identify any file, such as file 1402, that contains an image of a car or mentions cars in its text content. Tagging files is useful in combination with other, more structured forms of file organization. For example, the list of all files tagged "car" can be further focused on just ads, meeting notes, or meeting photos using the tabs 1404 on the left panel.

Figure 15:
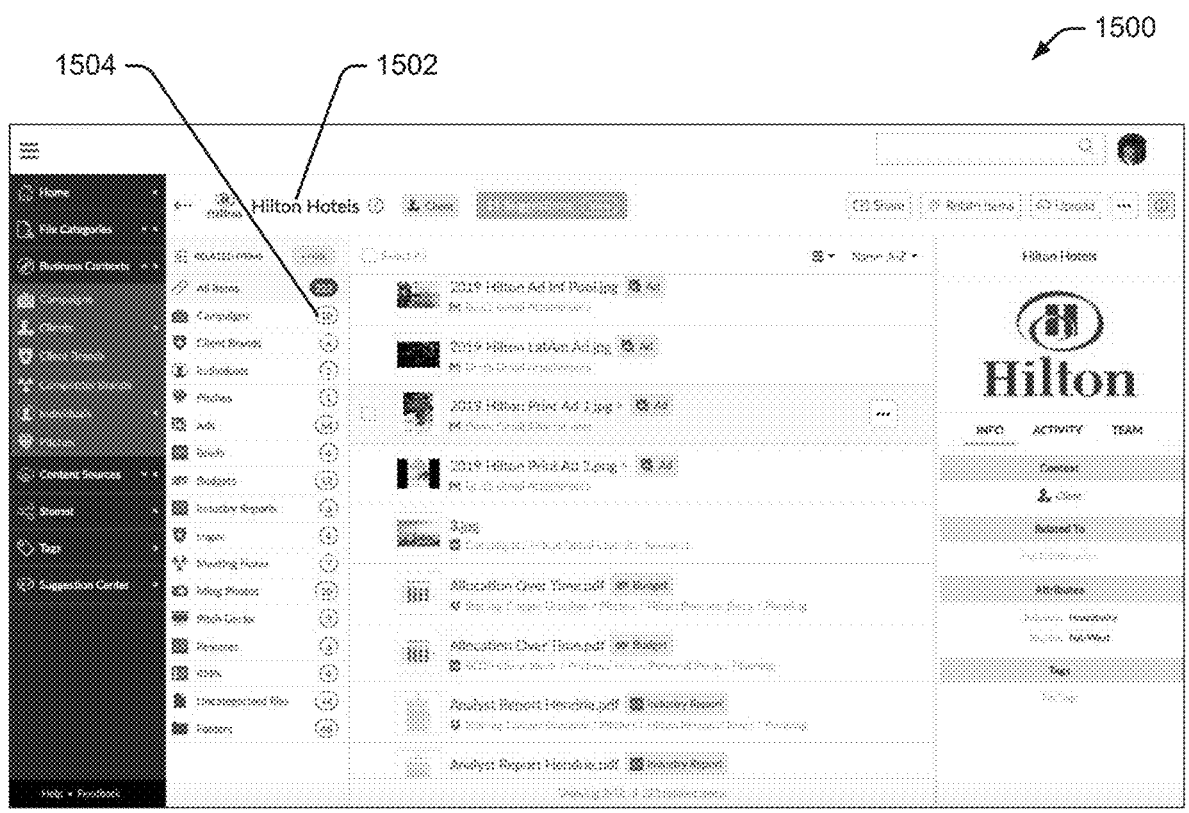

FIG. 15 illustrates an example user interface 1500 identifying a detailed view of a client. The described systems and methods can automatically relate files and folders to a business context, such as a client, to present a comprehensive view by client, by project, and the like. The example of FIG. 15 shows various information related to a client 1502 "Hilton Hotels." A left panel 1504 contains tabs to let the user focus on related items by context, such as all Hilton-related campaigns or pitches. Additional tabs provide more detail on related files and folders by category, such as all Hilton-related ads, industry reports, or meeting notes.

Figure 16:
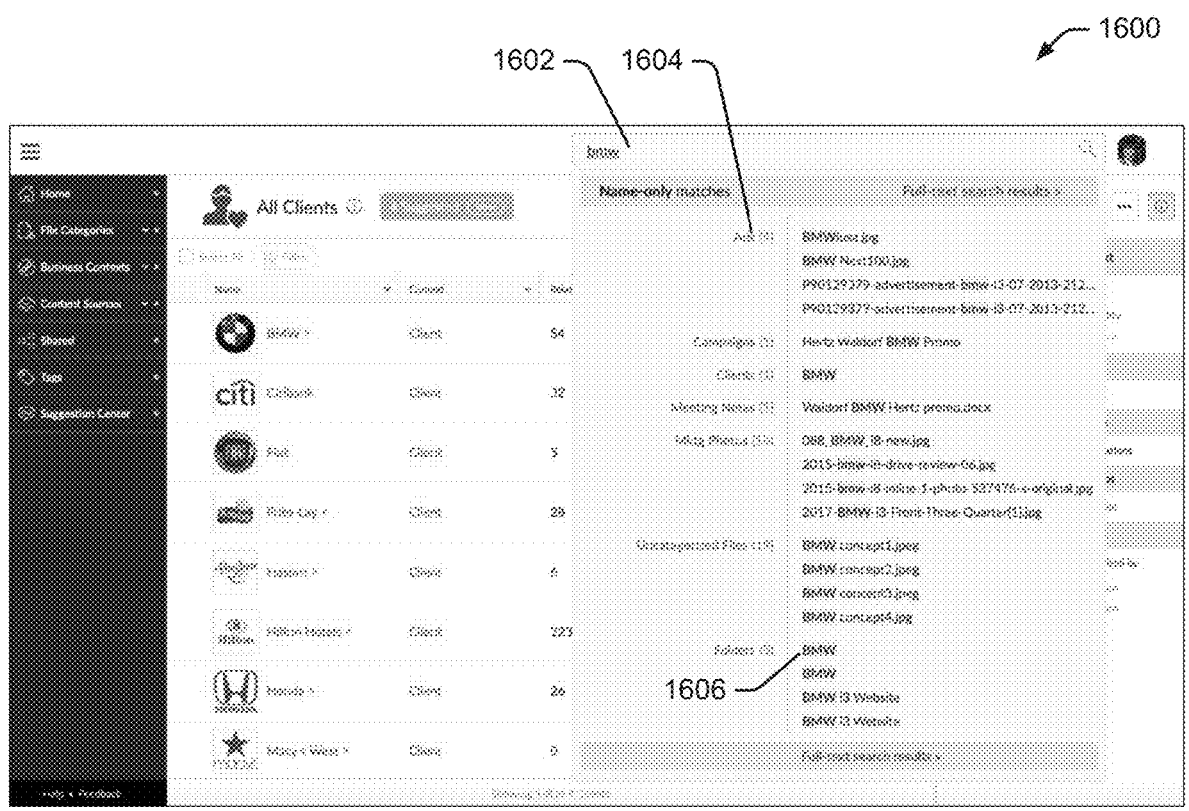

FIG. 16 illustrates an example user interface 1600 identifying a search operation. The described systems and methods support full-text search capability 1602 across multiple connected content sources. Matches 1604 and 1606 appear as the user types the search term. The matches may be organized by category or context.

Figure 17:
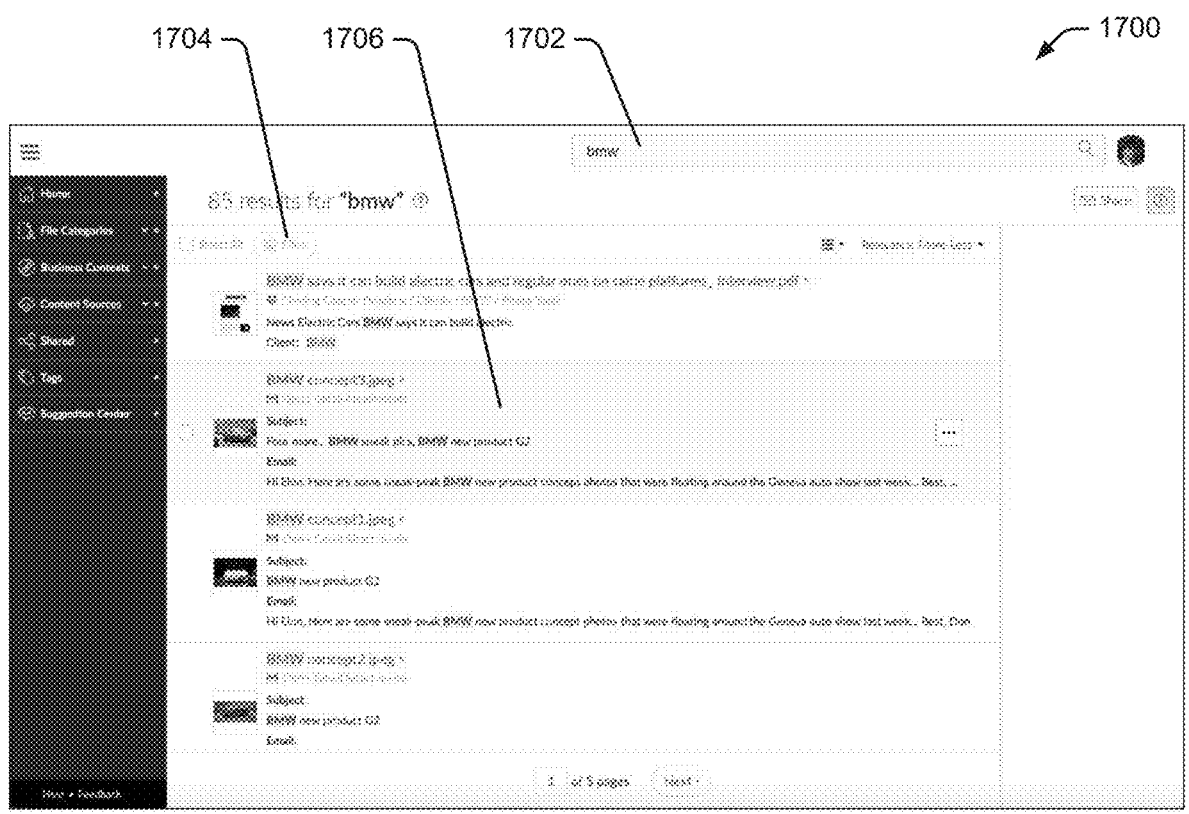

FIG. 17 illustrates an example user interface 1700 identifying a search operation. The systems and methods described herein performs a search 1702 across multiple connected content sources. The individual search results 1706 show the reason for the "match," such as a match in a file or folder name, a match with one of the tags, a match within the text body of a file, or a match within an email subject or message content. Various filtering capabilities 1704 are available to narrow the search results based on any number of parameters, such as file category, related client, region, and the like.

Figure 18:
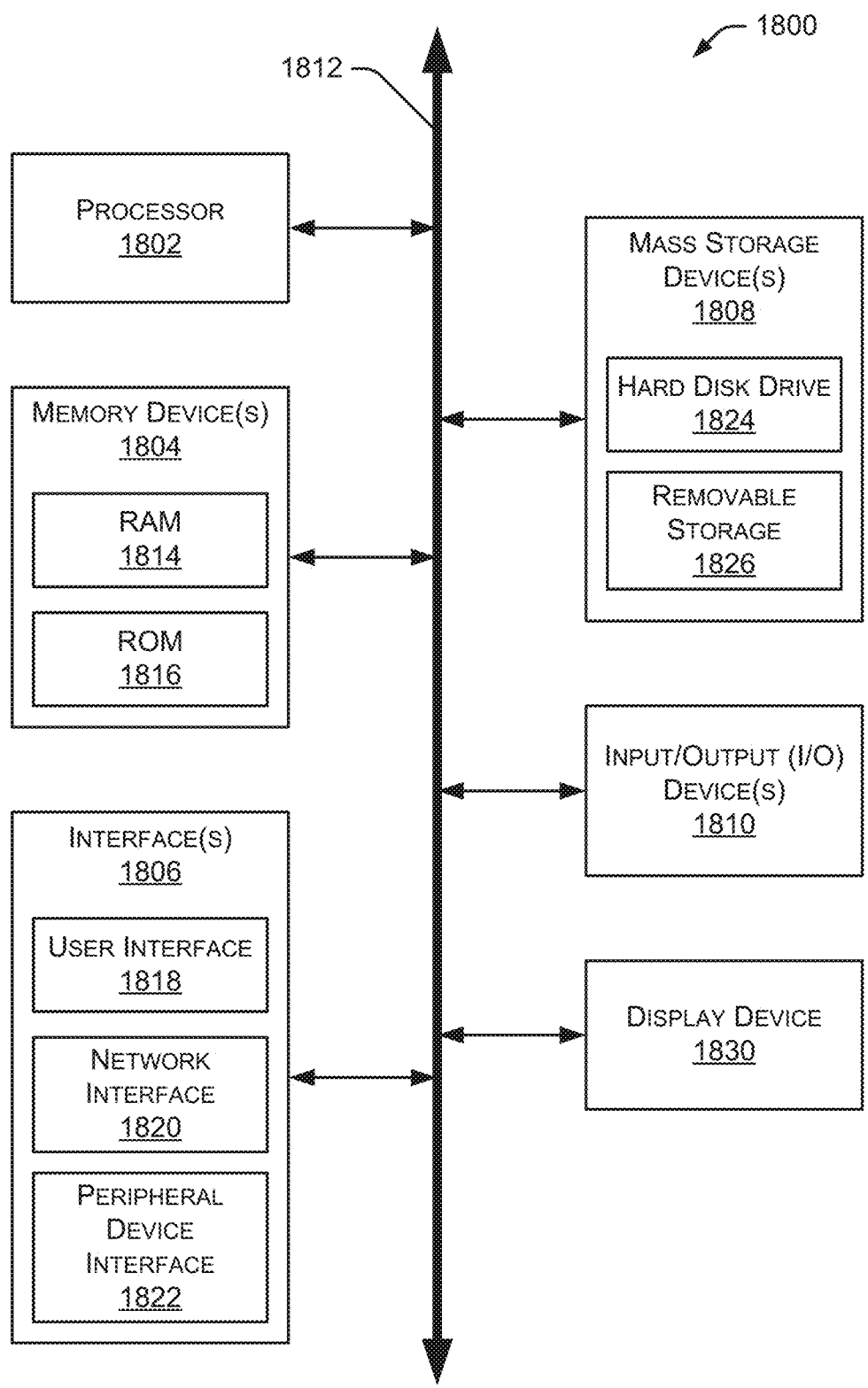
FIG. 18 is a block diagram depicting an example computing device suitable for implementing the systems and methods described herein.

FIG. 18 is a block diagram depicting an example computing device 1800 suitable for implementing the systems and methods described herein. In some embodiments, a cluster of computing devices interconnected by a network may be used to implement any one or more components of the systems discussed herein.

Computing device 1800 may be used to perform various procedures, such as those discussed herein. Computing device 1800 can function as a server, a client, or any other computing entity. Computing device can perform various functions as discussed herein, and can execute one or more application programs, such as the application programs described herein. Computing device 1800 can be any of a wide variety of computing devices, such as a desktop computer, a notebook computer, a server computer, a handheld computer, tablet computer and the like.

Computing device 1800 includes one or more processor(s) 1802, one or more memory device(s) 1804, one or more interface(s) 1806, one or more mass storage device(s) 1808, one or more Input/Output (I/O) device(s) 1810, and a display device 1830 all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM) 1814) and/or nonvolatile memory (e.g., read-only memory (ROM) 1816). Memory device(s) 1804 may also include rewritable ROM, such as Flash memory.

Mass storage device(s) 1808 include various computer readable media, such as magnetic tapes, magnetic disks, optical disks, solid-state memory (e.g., Flash memory), and so forth. As shown in FIG. 18, a particular mass storage device is a hard disk drive 1824. Various drives may also be included in mass storage device(s) 1808 to enable reading from and/or writing to the various computer readable media. Mass storage device(s) 1808 include removable media 1826 and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, lenses, CCDs or other image capture devices, and the like.

Display device 1830 includes any type of device capable of displaying information to one or more users of computing device 1800. Examples of display device 1830 include a monitor, display terminal, video projection device, and the like.

Interface(s) 1806 include various interfaces that allow computing device 1800 to interact with other systems, devices, or computing environments. Example interface(s) 1806 include any number of different network interfaces 1820, such as interfaces to local area networks (LANs), wide area networks (WANs), wireless networks, and the Internet. Other interface(s) include user interface 1818 and peripheral device interface 1822. The interface(s) 1806 may also include one or more user interface elements 1818. The interface(s) 1806 may also include one or more peripheral interfaces such as interfaces for printers, pointing devices (mice, track pad, etc.), keyboards, and the like.

Bus 1812 allows processor(s) 1802, memory device(s) 1804, interface(s) 1806, mass storage device(s) 1808, and I/O device(s) 1810 to communicate with one another, as well as other devices or components coupled to bus 1812. Bus 1812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1800, and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
accessing a file from a file storage system;
automatically and without user intervention categorizing the file into a plurality of categories, including:
deriving a recognition sample from file characteristics of the file, including:
formulating instructions defining how to extract the file characteristics from the file; and
including the instructions in the recognition sample;
comparing the recognition sample to characteristics of one or more files in each of a plurality of category clusters; and
categorizing the file in a category and in another category based on the comparisons including the recognition sample, including:
associating a decay factor with the file responsive to categorizing the file into the category; and
determining a rule confidence score is sufficient to also categorize the file into the other category in view of the decay factor;
accessing another file from another different file storage system;
automatically and without user intervention categorizing the other file into another different plurality of categories that partially overlaps with the plurality of categories, including:
deriving another recognition sample from other characteristics of the other file;
comparing the other recognition sample to the characteristics of the one or more files in each of the plurality of category clusters; and
categorizing the other file in the category and in a further category based on the comparisons including the other recognition sample;
receiving a search request requesting files categorized into the category;
responsive to the search request, analyzing file categorization and characterization data associated with a plurality of files spanning a plurality of files storage systems, including the file storage system and the other different file storage system;
locating the file at the file storage system and the other file at the other different storage system based on the analysis; and
indicating inclusion of the file and the other file in the category at a user interface.

2. The method of claim 1, wherein categorizing the file in a category and in another category comprises categorizing the file as associated with a user.

3. The method of claim 1, wherein categorizing the file in a category and in another category comprises categorizing the file based on at least one of a document context or a business context.

4. The method of claim 1, wherein deriving a recognition sample from characteristics of the file comprises deriving a recognition sample from an appearance of the file.

5. The method of claim 1, wherein automatically and without user intervention categorizing the file into a plurality of categories comprises an artificial intelligence engine categorizing the file into the plurality of categories.

6. The method of claim 1, wherein categorizing the file in a category and in another category comprises categorizing the file based on an ontology.

7. The method of claim 3, wherein categorizing the file in a category and in another category comprises tagging the file.

8. The method of claim 1, wherein accessing the file from a file storage system comprises accessing the file from one of: a drive storage system or a messaging storage system.

9. The method of claim 1, wherein indicating inclusion of the file and the other file in the category at a user interface comprises indicating the file and the other file in a user content source at the user interface.

10. The method of claim 9, further comprising, simultaneously with indicating inclusion of the file and the other file in the category, indicating inclusion of the file in the other category at the user interface and indicating inclusion of the other file in the further category at the user interface.

11. A computer system comprising:
a processor;
system memory coupled to the processor and storing instructions configured to cause the processor to:
  access a file from a file storage system;
  automatically and without user intervention categorize the file into a plurality of categories, including:
    derive a recognition sample from file characteristics of the file, including:
      formulate instructions defining how to extract the file characteristics from the file; and
      include the instructions in the recognition sample;
    compare the recognition sample to characteristics of one or more files in each of a plurality of category clusters; and
    categorize the file in a category and in another category based on the comparisons including the recognition sample, including:
      associate a decay factor with the file responsive to categorizing the file into the category; and
      determine a rule confidence score is sufficient to also categorize the file into the other category in view of the decay factor;
  access another file from another different file storage system;
  automatically and without user intervention categorize the other file into another different plurality of categories that partially overlaps with the plurality of categories, including:
    derive another recognition sample from other characteristics of the other file;
    compare the other recognition sample to the characteristics of the one or more files in each of the plurality of category clusters; and
    categorize the other file in the category and in a further category based on the comparisons including the other recognition sample;
  receive a search request requesting files categorized into the category;
  responsive to the search request, analyze file categorization and characterization data associated with a plurality of files spanning a plurality of files storage systems, including the file storage system and the other different file storage system;
  locate the file at the file storage system and the other file at the other different storage system based on the analysis; and
  indicate inclusion of the file and the other file in the category at a user interface.

12. The computer system of claim 11, wherein the instructions configured to derive a recognition sample from characteristics of the file comprise instructions configured to derive a recognition sample from an appearance of the file.

13. The computer system of claim 11, wherein instructions configured to categorize the file in a category and in another category comprise instructions configured to categorize the file categorization based on at least one of a document context or a business context.

14. The computer system of claim 11, wherein instructions configured to automatically and without user intervention categorize the file into a plurality of categories comprise an artificial intelligence engine configured to categorize the file into the plurality of categories.

15. The computer system of claim 11, wherein instructions configured to indicate inclusion of the file and the other file in the category at a user interface comprises instructions configured to indicate the file and the other file in a user content source at the user interface.

16. The computer system of claim 15, further comprising instructions configured to, simultaneously with indicating inclusion of the file and the other file in the category, indicate inclusion of the file in the other category at the user interface and indicate inclusion of the other file in the further category at the user interface.

17. The computer system of claim 11, wherein instructions configured to categorize the file in a category and in another category comprise instructions configured to categorize the file as associated with a user.

18. The computer system of claim 11, wherein instructions configured to categorize the file in a category and in another category comprise instructions configured to categorize the file based on an ontology.

19. The computer system of claim 11, wherein instructions configured to categorize the file in a category and in another category comprise instructions configured to tag the file.

20. The computer system of claim 11, wherein instructions configured to access the file from a file storage system comprise instructions configured to access the file from one of: a drive storage system or a messaging storage system.

* * * * *